United States Patent
Strom et al.

(10) Patent No.: US 6,443,813 B1
(45) Date of Patent: Sep. 3, 2002

(54) PROCESS OF ELIMINATING RIDGES FORMED DURING DICING OF AERODYNAMIC SLIDERS, AND SLIDERS FORMED THEREBY

(75) Inventors: Richard A. Strom; Gordon M. Jones, both of Eagan, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/818,444

(22) Filed: Mar. 27, 2001

Related U.S. Application Data

(60) Provisional application No. 60/196,758, filed on Apr. 12, 2000.

(51) Int. Cl.[7] .................................................. B24B 1/00
(52) U.S. Cl. ........................ 451/41; 125/12; 29/603.12; 360/122
(58) Field of Search ............................ 451/41, 54, 28, 451/11; 29/603.07, 603.12, 603.16, 603.14, 603.01; 360/121, 122, 126, 127, 128, 123; 125/12

(56) References Cited

U.S. PATENT DOCUMENTS

| | | | | |
|---|---|---|---|---|
| 4,011,692 A | * | 3/1977 | Bos et al. ...................... 451/54 |
| 4,098,032 A | * | 7/1978 | Olbert .......................... 451/57 |
| 5,086,360 A | | 2/1992 | Smith et al. ................. 360/103 |
| 5,091,810 A | | 2/1992 | Kakizaki et al. ............. 360/103 |
| 5,097,370 A | | 3/1992 | Hsia ............................ 360/103 |
| 5,128,822 A | | 7/1992 | Chapin et al. ............... 360/103 |
| 5,154,022 A | * | 10/1992 | Chalco et al. ................ 451/36 |
| 5,177,860 A | | 1/1993 | Yura et al. ..................... 29/603 |
| 5,285,342 A | | 2/1994 | Matsuzawa et al. ......... 360/125 |
| 5,299,081 A | | 3/1994 | Hatch et al. ................. 360/104 |
| 5,313,353 A | | 5/1994 | Kohso et al. ................ 360/104 |
| 5,349,487 A | | 9/1994 | Egawa et al. ................ 360/103 |
| 5,388,325 A | | 2/1995 | Matsuzawa et al. ........... 29/603 |
| 5,473,485 A | | 12/1995 | Leung et al. ................ 360/103 |
| 5,509,554 A | | 4/1996 | Samuelson et al. ........... 216/22 |
| 5,516,323 A | * | 5/1996 | Carlson et al. ................ 451/54 |
| 5,525,549 A | | 6/1996 | Fukada et al. ............... 437/227 |
| 5,640,755 A | | 6/1997 | Kubota et al. ............ 29/603.16 |
| 5,718,035 A | | 2/1998 | Yamanaka et al. ......... 29/603.1 |
| 5,751,517 A | | 5/1998 | Agarwal ...................... 360/103 |
| 5,771,133 A | | 6/1998 | Goto et al. .................. 360/103 |
| 5,771,134 A | | 6/1998 | Kurita et al. ................ 360/103 |
| 5,786,964 A | | 7/1998 | Sone et al. .................. 360/106 |
| 5,805,390 A | | 9/1998 | Takeura ....................... 360/113 |
| 5,871,868 A | | 2/1999 | Pai ................................. 430/5 |
| 6,093,083 A | * | 7/2000 | Lackey ......................... 451/28 |

FOREIGN PATENT DOCUMENTS

JP      2-121387      10/1988

* cited by examiner

Primary Examiner—Eileen P. Morgan
Assistant Examiner—Hadi Shakeri
(74) Attorney, Agent, or Firm—Westman, Champlin & Kelly, P.A.

(57) ABSTRACT

A process of dicing a bar to form a plurality of sliders having air bearing surfaces commences with defining a dice lane having a nominal surface between adjacent slider portions on the bar, opposite edges of the dice lane defining respective edge surfaces of adjacent slider portions. The dice lane is cut away with a blade to form an edge surface of the slider. A barrier trench is formed in the nominal surface along each edge of the dice lane. The barrier trench has a width that extends a predetermined distance into the slider portion of the bar from the edge of the dice lane and a predetermined depth to eliminate ridges in the air bearing surface of the slider. The barrier trench is formed either before or after the dicing of the slider. The slider thus formed is characterized by an absence of ridges in the air bearing surface.

15 Claims, 6 Drawing Sheets

PROCESS OF ELIMINATING RIDGES FORMED DURING DICING OF AERODYNAMIC SLIDERS, AND SLIDERS FORMED THEREBY

CROSS-REFERENCE TO RELATED APPLICATION

This application claims priority of U.S. Provisional Application No. 60/196,758 filed Apr. 12, 2000 by Richard A. Strom and Gordon M. Jones for "Dice Ridge Control".

FIELD OF THE INVENTION

This invention relates to aerodynamic sliders and heads for disc storage drives, and particularly to manufacturing such sliders and heads.

BACKGROUND OF THE INVENTION

Sliders and sliders containing magnetic heads are typically manufactured by thin-film techniques such that several thousands of sliders or slider/head combinations are formed from a single substrate or wafer. The wafer is sliced into row bars, and each row bar is mounted to a mount bar by an adhesive. The slider features, including rails and transducing heads, are defined on the row bar, which is lapped smooth to form an air bearing surface for each slider on the bar. The bars are then diced into individual sliders for subsequent assembly into disc drives.

Dicing is accomplished by cutting the bar at predetermined locations between sliders using a diamond cutting blade. The cutting locations are called "dice lanes" and are of a predetermined width, matching the width of the cutting blade. The dicing operation creates compressive stresses in the material at the edge surfaces of the slider. These compressive stresses create undesirable ridges in the topography of the air bearing surface of the slider. More particularly, the compressive stress propagates to form the undesirable ridges. Ridge formation at the edge of a slider due to dicing extends as much as 300 Angstroms (Å) (0.03 microns) in height above the slider surface with a width as much as 50 microns from the edge surface of the diced cut. These ridges adversely affect the flying characteristics of the slider, and contribute to increased head crashes, particularly as the ridge height approaches the fly height of the slider.

There are several techniques to minimize formation of these ridges. One technique is to dice the bars into individual sliders using an ion milling process. Ion milling techniques generate virtually no stress in the slider material, thereby eliminating ridges altogether. However, ion milling is a slow process, compared to diamond blade dicing, and significantly increases the processing time for manufacture. Moreover, material milled by ion milling redeposits creating cleanliness issues. Consequently, ion milling is not an economically feasible option for dicing sliders in a production mode. A more conventional technique to minimize ridges is to position the rails having the air bearing surfaces far enough from the dicing lane so that compressive stress generated by the diamond saw dicing cannot propagate to the rail to form ridges thereon. However, this technique results in reduced air bearing surface area, thus degrading performance of the air bearing. Therefore, a need exists for an economically feasible technique for dicing bars into sliders using a diamond blade for cutting, without formation of ridges at the air bearing surface. The present invention provides a solution to this and other problems, and offers other advantages over the prior art.

SUMMARY OF THE INVENTION

The present invention is directed to minimizing the ridges formed during dicing operations.

In one form of the invention, a process is provided for dicing a bar to form a plurality of sliders each having an air bearing surface. A dice lane having a nominal surface is defined between adjacent slider portions on the bar. The dice lane has opposite edges defining respective edge surfaces of adjacent slider portions. The dice lane is cut away with a blade to form an edge surface of the slider. A barrier trench is formed in the nominal surface along each edge. The barrier trench has a predetermined depth and a width that extends a predetermined distance into the slider portion from the edge. The barrier trench inhibits formation of ridges on the air bearing surface.

In some embodiments, the barrier trench is formed in the bar at the edges of the dice lane before dicing the bar into sliders. In other embodiments, the barrier trench is formed in the sliders after the bar has been diced.

In one embodiment of the invention, the slider portions include rails defining the air bearing surface. The rails are positioned from the edge surfaces of the slider by a distance less than about 50 microns.

In another form of the invention a bar, formed of slider material, includes a plurality of slider features having an air bearing surface. A dice lane having a nominal surface is between adjacent slider features. Each dice lane has opposite edges along which the bar may be cut to remove the dice lane and separate the slider features into individual sliders. A barrier trench in the nominal surface extends along each edge of the dice lane. The barrier trench extends a predetermined distance into the slider features from the edge of the dice lane and to a predetermined depth from the nominal surface to prevent formation of ridges in the air bearing surface when the sliders are separated by a blade cutting away the dice lane.

The resulting slider is characterized by an absence of ridges in the air bearing surface.

Other features and benefits that characterize the present invention will be apparent upon reading the following detailed description and review of the associated drawings.

DETAILED DESCRIPTION OF ILLUSTRATIVE EMBODIMENTS

Figure 1:
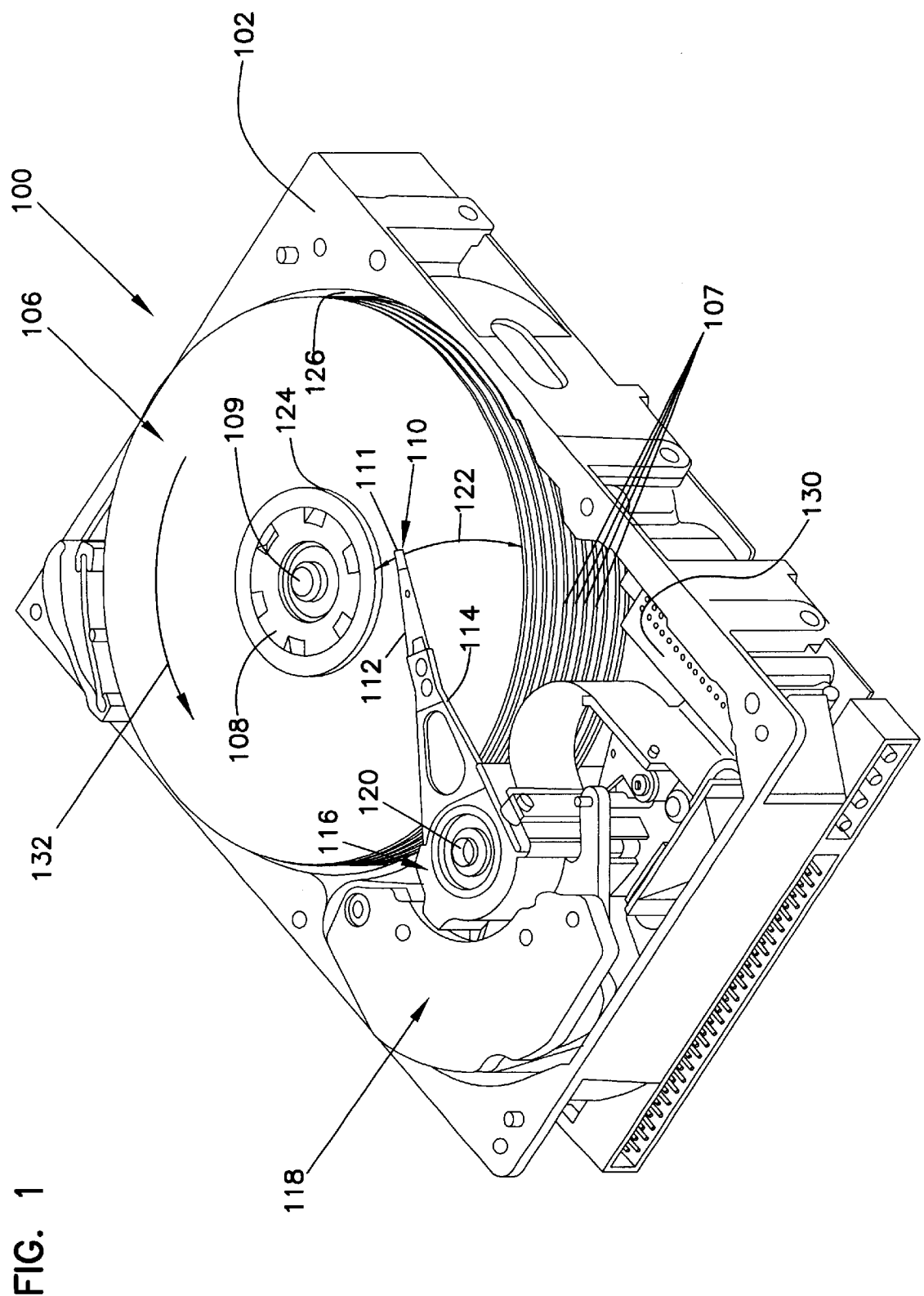
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
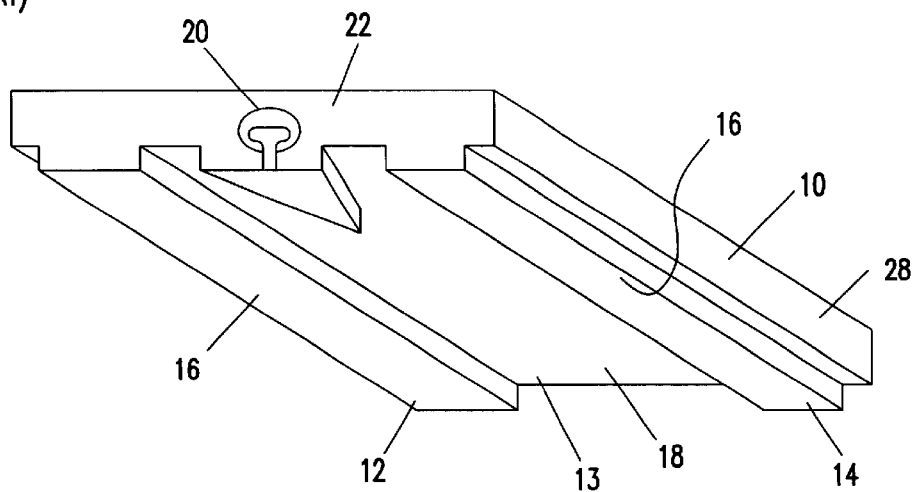
FIG. 2 is a perspective view of a prior art slider.
Figure 3:
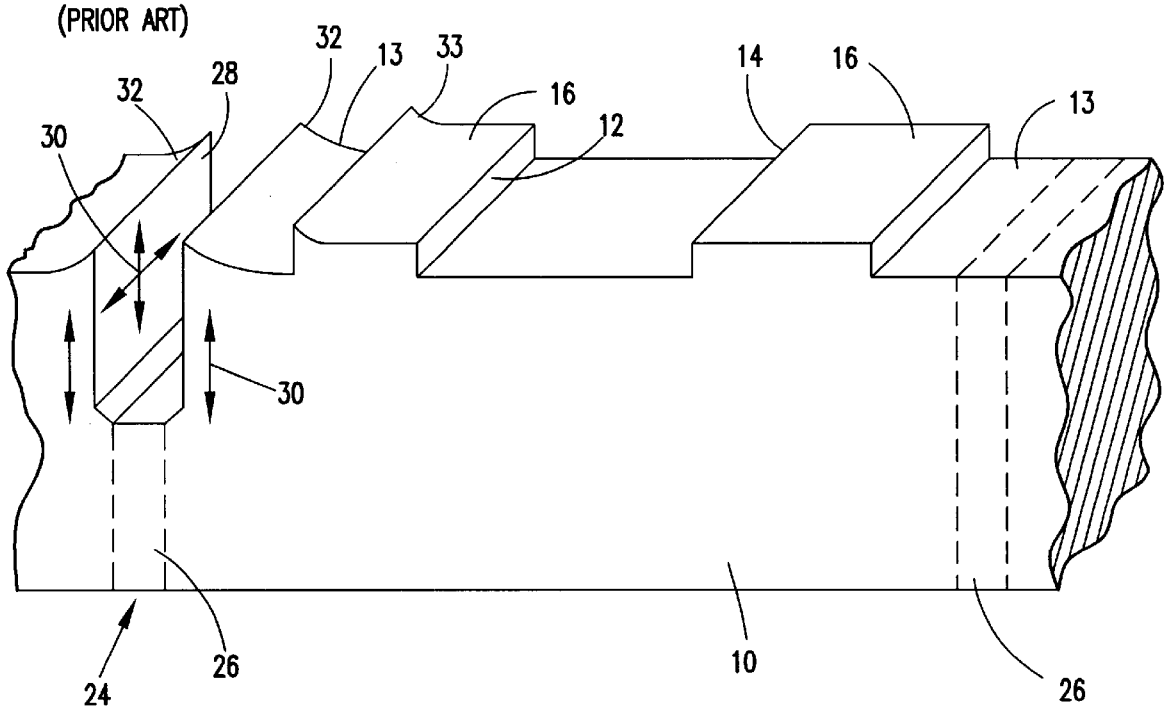
FIG. 3 is a perspective view illustrating ridges formed at the edges of the prior art slider during a dicing operation.

FIGS. 2 and 3 illustrate portions of a slider 10 as might be found in the prior art. The slider typically is manufactured from a suitable material, such as AlTiC and includes rails 12 and 14 protruding some height above nominal surface 13. The rails have smooth air bearing surfaces 16, and a pressure cavity 18 is formed between the rails. The rails and pressure cavity are designed so that air bearing surfaces 16 on slider 10 confronts a revolving disc causing the slider to aerodynamically "fly" a predetermined distance from the disc. A magnetic head 20 is formed on the trailing edge 22 of slider 10, usually on a center rail. Head 20 includes a transducing element (not shown) at air bearing surface 16.

Slider 10 is typically manufactured in mass from a wafer such that a plurality of sliders are fabricated simultaneously on the wafer and the wafer is subsequently diced into finished sliders. More particularly, the wafer is cut into row bars 24 containing a plurality of slider features 10 in side-by-side relation, as illustrated in FIG. 3. Heads 20 are formed at the trailing edge of the slider features and air bearing surface 16 is lapped smooth for all head/sliders on the bars. In some cases, the lapping process is accomplished over a controlled path to form a curved shape, or crown, to the air bearing surface. The crown shape may be concave or convex to the slider, forming a curve that extends along the length of the slider feature and, in some cases, across its width. Bars 24 are then diced into individual sliders 10 by cutting through the bars along dicing lanes 26 with a diamond blade. Cutting through bar 24 forms the edges 28 of slider 10.

The problem to which the present invention is directed is that the dicing operation with the diamond blade generates compressive stresses in the slider material in the direction of arrows 30. The stress displaces slider material, creating ridges 32 at the edge surfaces 28 that protrude above nominal surface 13. In addition, the compressive stress propagates into the slider from edges 28 causing a ridge 33 to form on rails 16. If the slider includes a crown surface, these ridges interfere with the advantages of the crown. Experiments conducted on sliders having a thickness of 11.4 mils (0.29 mm) demonstrate that these ridges extend as much as 300 Å above nominal surface 13. The ridges taper exponentially to fair, or smoothly transistion, into the nominal surface about 50 microns from the edge surface 28.

In most cases, ridges 32 do not protrude above the surface of rails 12 and 14 to cause significant problems. However, ridges 33 extend from the air bearing surface 16, adversely affecting the flying characteristics of the slider. Moreover, if ridges 33 extend higher than the fly height of the slider, they can cause inadvertent contact with the confronting disc in a condition known as "head crashes". Ridges 33 can be minimized by positioning rails 12 and 14 far enough from surfaces 28 so that compressive stress from the dicing operation cannot generate significant ridges. However, positioning rails 12 and 14 at a distance from edge surfaces 28 affects the air bearing surface and the flying characteristics of the slider.

Figure 4:
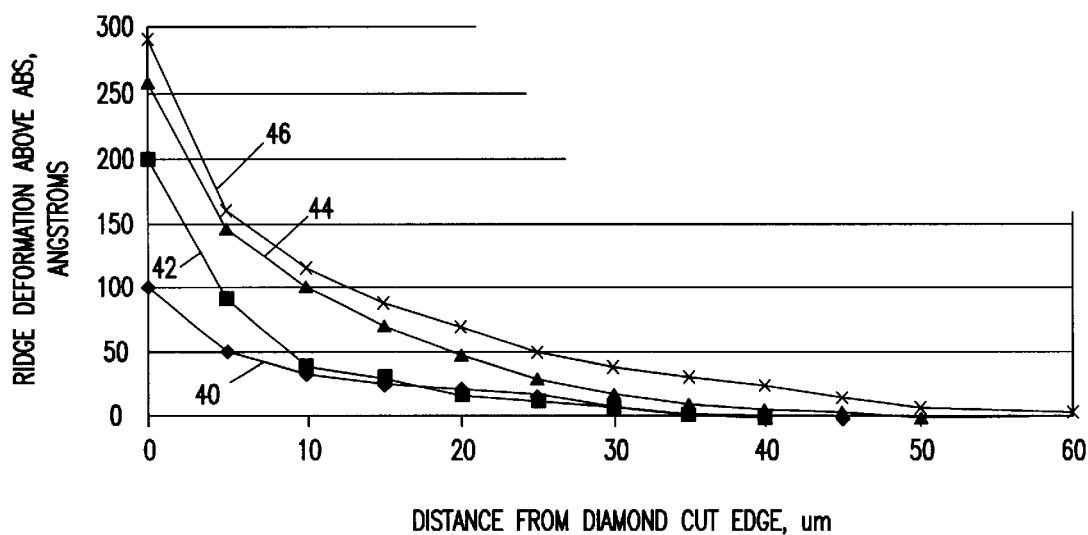
FIGS. 4 and 5 are graphs illustrating the effects of the depth of cutting during dicing on the ridge formation.

FIG. 4 illustrates the profile of ridges 32 due to cuts of differing depths into the sliders by the diamond blade. Thus, curve 40 illustrates the profile of a ridge 32 due to cutting a depth of 0.4 mils (0.01 mm) into the 11.4 mil thick slider. As shown by curve 40, the ridge formed by the 0.4 mil cut extends about 100 Å from nominal surface 13 at edge surface 28 and tapers to the nominal surface about 50 mils from the edge surface. Similarly, curves 42, 44 and 46 illustrate the profile of respective ridges 32 due to cut depths of 1.6 mils (0.04 mm), 4.4 mils (0.11 mm) and 11.4 mils (0.29 mm); the 11.4 mil cut being completely though the bar. As shown by curve 46, ridge 32 is as high as 300 Å above nominal surface 13 with a cut depth through the bar.

If rails 12 and 14 are contiguous with edge 28, ridges 32 extend from the rails by a distance above the air bearing surface as much as 300 Å. Where rails 12 and 14 are set back from edges 28, ridges 33 are formed in the rails due to propagation of the compressive stress due to dicing. Thus, if rails 12 and 14 are positioned 25 microns (about 1 mil) from edges 28, the curve of FIG. 4 demonstrates that ridges 33 will extend as much as 50 Å above air bearing surface 16. Where rails 12 and 14 are 40 microns from edges 28, ridges 33 will extend as much as 25 Å above air bearing surface 16. Although rails 12 and 14 might be higher than 300 Å, rendering the effects of ridge 32 of minimal consequence, ridge 33 nevertheless produces adverse effects of significant consequence.

Figure 5:
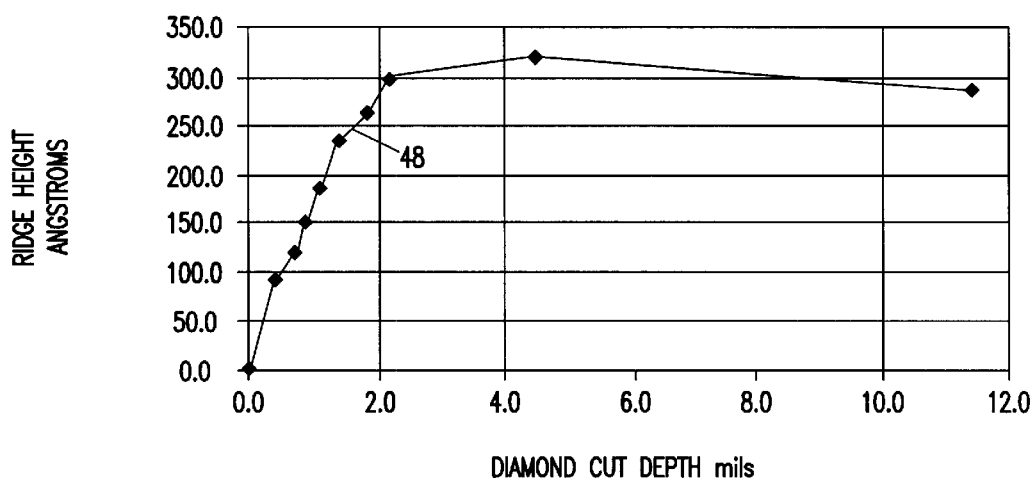

FIG. 4 illustrates the relationship that the maximum height of ridges 32 is related to the depth of the cut into the bar, but that the width of the ridge from the edge surface 28 does not significantly change with cut depth. However, as indicated by a comparison between curves 44 and 46, the height of ridge 32 due to a cut depth of 4.4 mils is not significantly different from the height of ridge 32 due to a cut depth of 11.4 mils. This is more graphically illustrated in FIG. 5 which plots the maximum height of ridges 32 based on different cut depths. Hence, as shown by curve 48, the height of ridges 32 increases nearly linearly with the depth of the cut to a cut depth of about 2 mils, with only slight changes in maximum ridge height when the cut depths are greater than 2 mils.

Ridges 32 and 33 can interfere with proper operation and flying characteristics of the slider. More particularly, if ridges 32 are not far removed from rails 12 and 14, they can affect the flying characteristics, thereby affecting performance of head 20. Moreover, if ridges 32 are so high as to near or exceed air bearing surface 16, they can lead to head crashes. Ridges 33 are more likely to cause the same problems because they are on the rails and extend from the air bearing surface. Consequently, the present invention is directed to minimizing the ridges.

Figure 6:
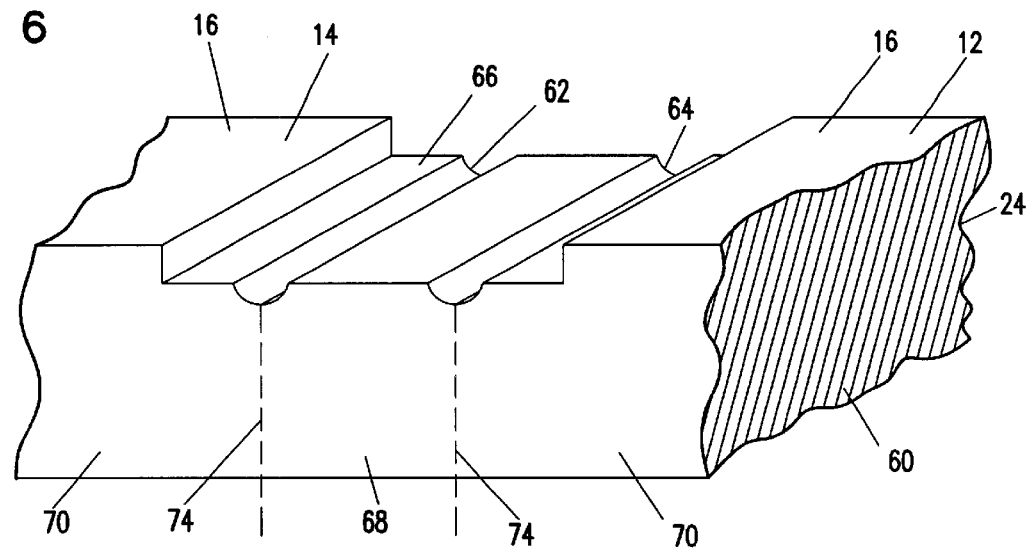
FIGS. 6–8 are perspective views illustrating a process of dicing sliders in accordance with a first embodiment of the present invention.
Figure 7:
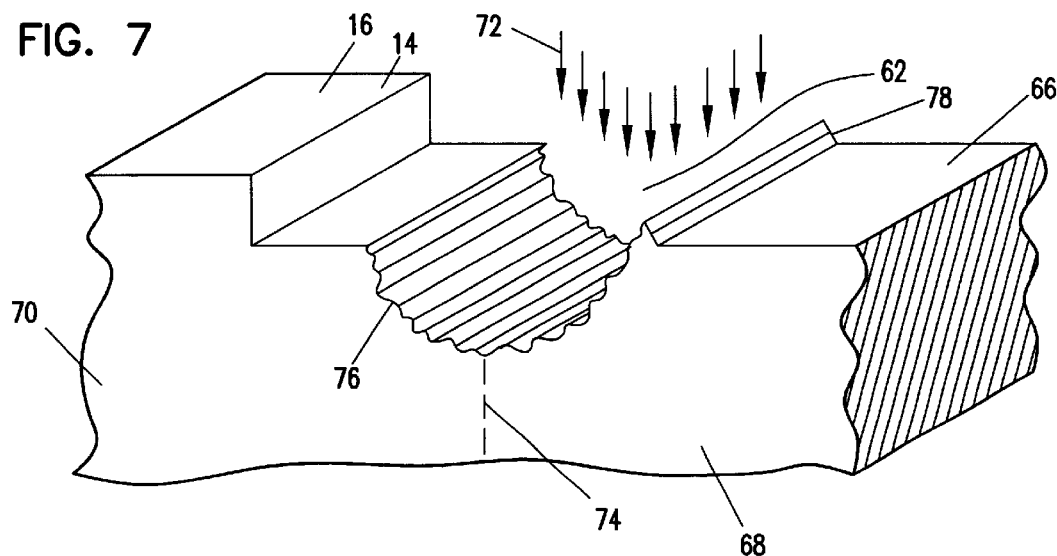
Figure 8:
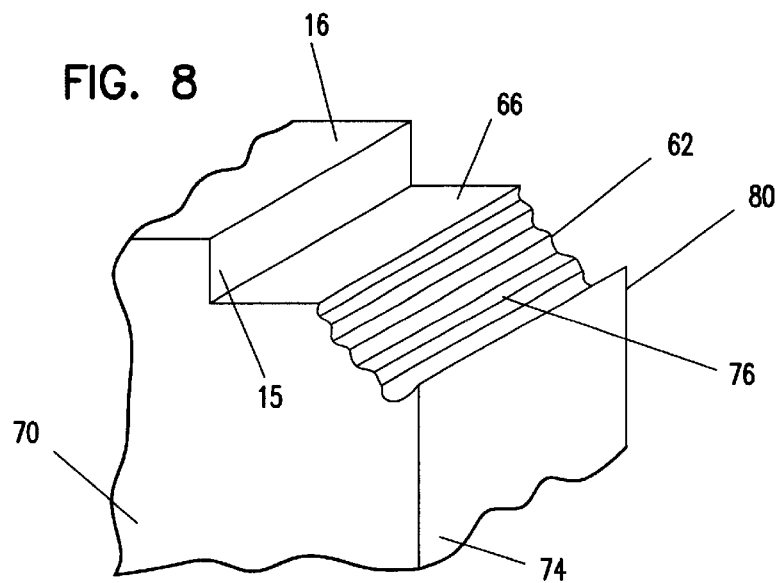

FIGS. 6–8 illustrate a process for minimizing ridges 32 and eliminating or nearly eliminating ridges 33 in accordance with a first embodiment of the present invention. FIG. 6 illustrates a portion of a bar 24 containing portions of two adjacent slider configurations 70. Trenches 62 and 64 are formed in nominal surface 66 along the edges of dice lane 68 between sliders 70. FIG. 7 illustrates an enlargement of one of the trenches, such as trench 62, showing formation of the trench by directing laser beams 72 to cut varying depths into the slider and dice lane material at the nominal surface 66. Alternatively, trenches 62 and 64 may be formed by an ion milling process. Each of trenches 62 and 64 is centered on an edge 74 of dice lane 68. Trenches 62 and 64 are formed by first cutting to a desired depth at a location in the region of dice lane 68 about 15 to 25 microns from the edge 74 of the dice lane. Laser cutting or ion milling is continued in overlapping fashion centered along side-by-side cutting paths 76, working across the edge of the dice lane and into the slider region, ending with a pass within slider 70 about 15 to 25 microns from edge 74. The cutting paths overlap so that the second and subsequent cuts include a portion of the cut path of the prior cut.

Laser cutting the slider material may form burrs along both sides of the laser cut path 76. It is believed that heat generated by the laser cutting ablates the material, displacing it to the sides of the cut path. During a second pass at adjacent paths, the laser cuts away the burr formed on one side during a first or prior pass, yet may not form a burr on the opposite side of the cut path, at a distance, or distal, from the first or prior cut path. Consequently, we prefer to start the cutting process in a more central portion of the dice lane 68 and work the laser cut paths to the edges 74 of the dice lane. As a result, material is removed from the region of trenches 62 and 64. Burrs 78 formed adjacent trenches 62, 64 are more centrally located within dice lanes 68 and are removed by diamond blade cutting with the remainder of the dice lane.

The depths of trenches 62 and 64 are preferably at least 2 mils, and may be as great as 8 mils having a width of about 30–50 microns so that the trenches extend about 15–25 microns into slider 70 from edge 74. Consequently, rails 12 and 14 are positioned so that edge surfaces 15 of the rails are a distance at least as great as the extent of trenches 62 and 64 from edges 74. Hence, the edge surfaces 15 of the rails are more than about 15–25 microns from edges 74.

As mentioned above, in some cases burrs 78 may form on the forward side of the cut path, distal from the prior cut path. This phenomenon is more likely in a laser cutting process than an ion milling process. Where these burrs occur, they may be the result of a concentration of laser energy in the material during second and subsequent passes. The concentration of laser energy occurs because there is less material to cut during the second and subsequent passes due to the void in material formed by the first or prior pass and the overlapping nature of the passes. The concentration of energy forms the burr along the forward side of the cut path, distal from the prior cut path.

Figure 9:
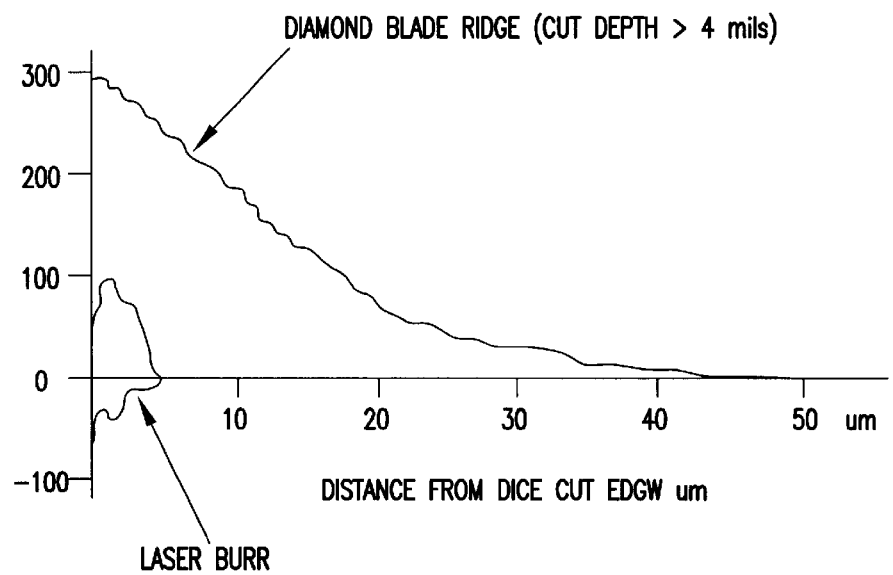
FIG. 9 is a graph illustrating the difference between burrs that might be formed during the process of FIGS. 6–8 and ridges.

The burrs at the forward side of the dice lane (inside the slider) may be minimized by reduction of laser cutting power during the second and subsequent passes, or may be ignored. We presently prefer to ignore the burrs. FIG. 9 compares the height and width of a burr, such as burr 78 (FIG. 7), to a ridge, such as ridge 32 (FIG. 3). As shown in FIG. 9, if a burr is formed, the height of the burr is not likely to be greater than 100 Å, with a width from the edge 74 of the slider of not more than about 5 microns. By comparison, a ridge 32 may reach a height of 300 Å and a width from the edge of the slider as great as 50 microns. Consequently, a burr has a significantly less effect on the slider performance than a ridge, and may be within acceptable production tolerances. Moreover, these burrs are more likely to occur in the dice lane which will be cut away.

FIG. 8 illustrates the separated slider 70, after diamond blade cutting away the dice lane. As shown in FIG. 8, the bars are diced with a diamond cutting blade to cut away dice lane 68 to form the edges 74 of sliders 70 at trenches 62, 64. Experiments reveal that trenches 62 and 64 form a barrier to propagation of compressive stress, resulting in the absence of ridges 33 that were formed in the prior art. Ridges 80 may form at edges 74 due to the dicing process, but these ridges are of little consequence to the operation of the slider because they are at the bottom of the trench, distal from nominal surface 66 and from air bearing surface 16. The remaining portions of trenches 62 and 64 formed by the laser cuts described in conjunction with FIGS. 6–8 form a chamfered edge for the slider between nominal surface 66 and edge surface 74 of each slider 70.

Figure 10:
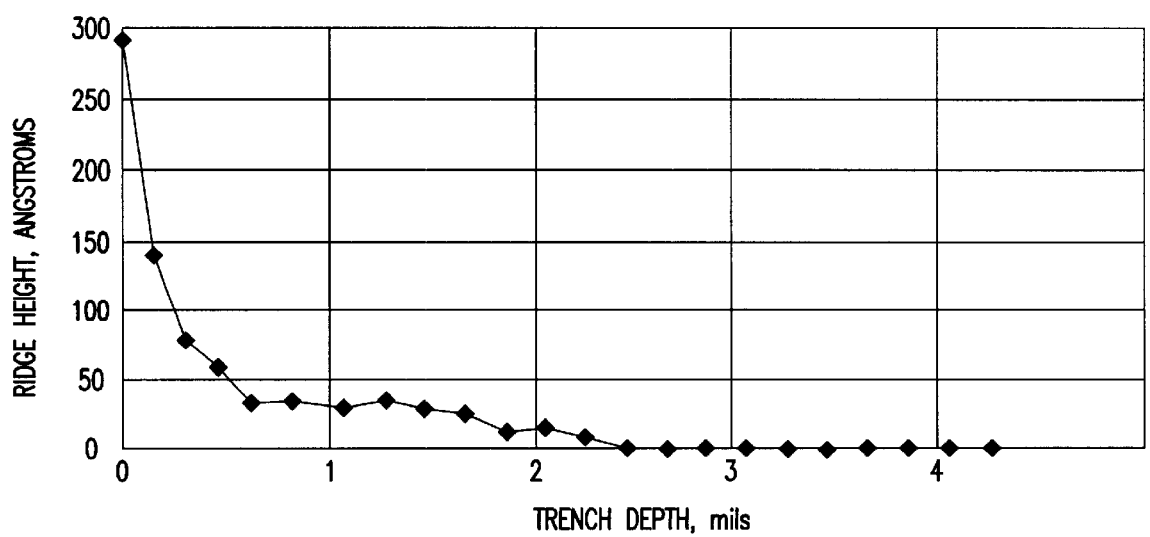
FIG. 10 is a graph illustrating the effect of the process of FIGS. 6–8.

FIG. 10 illustrates the effect of trenches 62 and 64 and illustrates that the trenches form barriers to the formation of ridges. More particularly, where no trench is employed (trench depth of 0 mils), ridge heights of up to 300 Å are observed. However, with the inclusion of trenches 62 and 64, the height of ridges 32 (FIG. 3) diminishes substantially exponentially, until ridge formation is absent where the trench has a depth greater than approximately 2.5 mils. With trenches less than 2.5 mils deep, some ridge formation is observed. Thus, with trench depths greater than about 2.5 mils, the trenches act as barriers to the formation of ridges.

Figure 11:
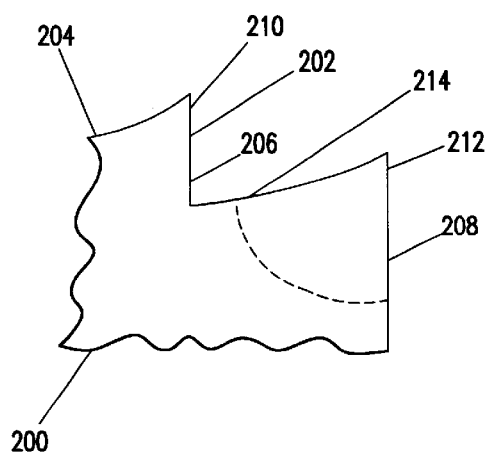
FIGS. 11–14 are side views illustrating second and third embodiments of the present invention.
Figure 12:
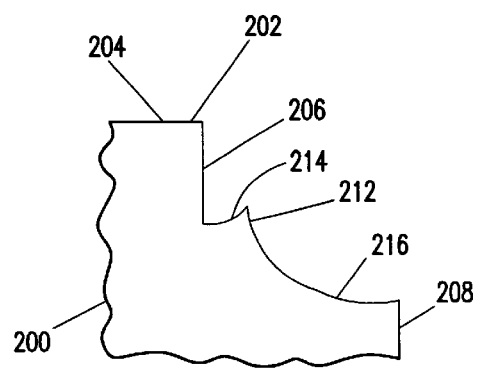

FIGS. 11 and 12 illustrate a second embodiment of the present invention. FIG. 11 illustrates a portion of the edge of a slider 200 having a rail 202 defining an air bearing surface 204 for the slider. The edge surface 206 of rail 202 is set some distance, such as 15 to 25 microns, from edge 208 of the slider that has been formed by cutting with a diamond blade, as previously described. Ridges 210 and 212 have been formed by the dicing process protruding from air bearing surface 204 and nominal surface 214 of the slider, as previously described. In accordance with the present invention, barrier trench 216 is formed at the intersection of edge 208 and nominal surface 214, as shown in FIG. 12, following the dashed lines in FIG. 11. As in the example of FIGS. 6–8, trench 216 is about 15 to 25 microns wide from surface 208 and at least 2 mils deep from nominal surface 214. Trench 216 relieves most of the stress formed by the dicing process, thereby reducing most of the ridge formation formed by the propagated stress. As a result, ridge 210 previously formed in the air bearing surface of the ridge is eliminated, and ridge 212 in nominal surface 214 is substantially reduced.

Figure 13:
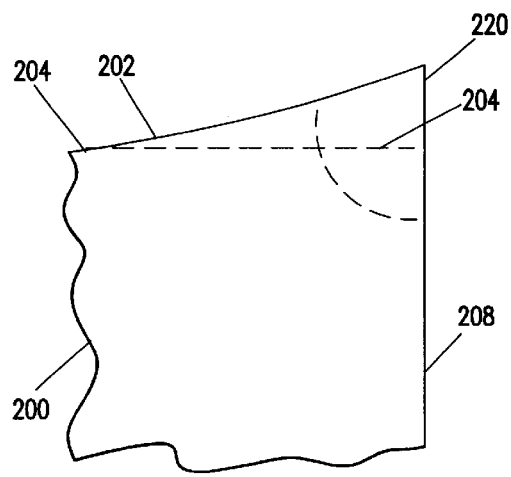
Figure 14:
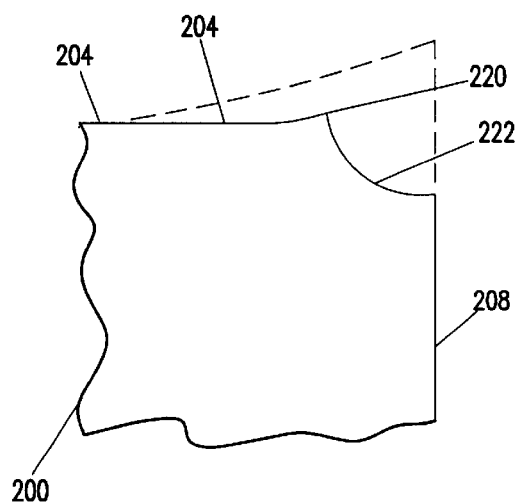

FIGS. 13 and 14 illustrate a third embodiment, differing from that illustrated in FIGS. 11 and 12 in that rail 202 extends to edge 208. In this case, a single ridge 220 is formed at edge 208 and protrudes up to 300 Å above air bearing surface 204. As shown in FIG. 14, trench 222 is cut into the slider at the intersection of surfaces 204 and 208 and extending up to 15 to 25 microns from surface 208 and at least 2 mils deep from surface 204, as shown in dashed lines in FIG. 13. As a result, the height of ridge 220 reduces by reducing the stress forming the ridge, even in regions outside the trench.

The present invention thus provides an aerodynamic slider characterized by the absence of ridges 33 at the air bearing surface 16 previously formed by a diamond blade dicing technique. Formation of the ridges is inhibited by forming barrier trenches 62, 64 along the edges of the dice lane 68.

The invention also provides a process of dicing a bar 24 to form a plurality of sliders 70 each having an air bearing surface 16. A dice lane 68 having a nominal surface 66 is defined between adjacent slider portions 70 of the bar, each portion having slider features. Dice lane 68 has opposite edges 74 defining respective edges of adjacent slider portions 70. The dice lane is cut away with a blade to form an edge surface 74 of a slider 70. A barrier trench 62, 64 is formed in the nominal surface 66 along each edge 74 of the dice lane 68 or slider 70. The barrier trench 62, 64 has a predetermined depth into the nominal surface and having a width that extends a predetermined distance into the slider portion from the edge. The predetermined depth and predetermined distance of the barrier trench are sized and arranged to inhibit formation of ridges 33 on the air bearing surface 16 of the slider.

In the embodiments of FIGS. 6–8, the barrier trench is formed in bar 24 before dicing the bar into sliders. In the embodiments of FIGS. 11–14, the barrier trench is formed in sliders 200 after dicing bar 24 into sliders.

Although the present invention has been described with reference to laser cutting and ion milling to form the barrier trench, those skilled in the art will recognize that the present invention may be practiced with other technologies, including but not limited to other etching systems employing other technologies, such as chemical etching.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the barrier trenches while maintaining substantially the same functionality without departing from the scope and spirit of the present invention. Thus, while the invention is described in connection with inhibiting formation of ridges on magnetic head sliders, it will be appreciated by those skilled in the art that the teachings of the present invention can be applied to other devices requiring close tolerances between moving parts, including flying optical heads and various machine parts, without departing from the scope and spirit of the invention.

What is claimed is:

1. A bar comprising:
   a plurality of slider features having an air bearing surface;
   a dice lane between adjacent slider features, each dice lane having opposite edges along which the bar may be cut to remove the dice lane and separate the adjacent slider features into separate sliders having edge surfaces defined by the edges of the dice lane, and
   a barrier trench in a nominal surface of the dice lane along each edge of the dice lane, each barrier trench extending a predetermined depth into the bar from the nominal surface and a predetermined distance into the respective slider feature from the respective dice lane edge to minimize formation of ridges when a blade removes the dice lane.

2. The bar of claim 1, wherein the predetermined depth is at least 2 mils and the predetermined distance is about 15–25 microns.

3. The bar of claim 1, wherein the slider features includes at least one rail extending substantially parallel to a slider edge at a distance less than about 50 microns from the slider edge and protruding from a nominal surface to define the air bearing surface.

4. The bar of claim 3, wherein the predetermined depth is at least 2 mils and the predetermined distance is about 15–25 microns.

5. A process of dicing a bar to form a plurality of sliders each having an air bearing surface, the bar containing adjacent slider portions having slider features and a nominal surface between adjacent slider features, the process comprising sequential steps of:
   a) defining a dice lane on the nominal surface, the dice lane having opposite edges defining respective edges of adjacent slider portions
   b) forming a barrier trench in the nominal surface along each dice lane edge, each barrier trench having a predetermined depth into the nominal surface and having a width that extends a predetermined distance into the respective slider portion from the respective dice lane edge to minimize ridges in the air bearing surface of the slider; and
   c) cutting away the dice lane with a blade to form an edge surface of a slider along a respective dice lane edge.

6. The process of claim 5, wherein the nominal surface is the air bearing surface.

7. The process of claim 5, wherein step c is performed by laser cutting the barrier trench.

8. The process of claim 5, wherein step c is performed by ion milling the barrier trench.

9. The process of claim 5, wherein the respective slider portion includes at least one rail extending from the nominal surface and defining the air bearing surface.

10. The process of claim 5, wherein the predetermined depth is at least 2 mils and the predetermined distance is about 15–25 microns.

11. A bar formed of slider material comprising:
   a plurality of adjacent slider features having an air bearing surface;
   a nominal surface between adjacent slider features;
   a dice lane on the nominal surface, the dice lane having opposite edges along which the bar may be cut to remove the dice lane and separate the adjacent slider features into separate sliders having edge surfaces defined by respective dice lane edges, and
   a barrier trench in the nominal surface along each edge of the dice lane, the barrier trench extending a predetermined depth into the bar from the nominal surface and a predetermined distance into the respective slider feature from a respective dice lane edge to inhibit formation of ridges in the air bearing surface when a blade cuts the bar to remove the dice lane.

12. The bar of claim 11, wherein the predetermined depth is at least 2 mils and the predetermined distance is about 15–25 microns.

13. The bar of claim 11, wherein the slider features includes at least one rail extending substantially parallel to one of the slider edge surfaces at a distance less than about 50 microns from the one slider edge surface and protruding from the nominal surface to define the air bearing surface.

14. The bar of claim 13, wherein the predetermined depth is at least 2 mils and the predetermined distance is about 15–25 microns.

15. A process of dicing a bar to form a plurality of sliders, the bar containing adjacent slider portions each having a nominal surface and at least one rail extending from the nominal surface and defining an air bearing surface, the nominal surface extending between rails of adjacent slider portions, the process comprising sequential steps of:

a) defining a dice lane on the nominal surface, the dice lane having opposite edges defining respective edges of adjacent slider portions;

b) cutting away the dice lane with a blade to form an edge surface of a slider along a respective dice lane edge; and c) forming a barrier trench in the nominal surface along each dice lane edge, each barrier trench having a predetermined depth into the nominal surface and having a width that extends a predetermined distance into the respective slider portion from the respective dice lane edge to minimize ridges in the air bearing surface on the rail.

* * * * *